United States Patent
Yoshida

(10) Patent No.: US 7,877,557 B2
(45) Date of Patent: Jan. 25, 2011

(54) INFORMATION PROCESSING SYSTEM, INFORMATION PROCESSING METHOD AND PROGRAM

(75) Inventor: Keisuke Yoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 97 days.

(21) Appl. No.: 10/630,714

(22) Filed: Jul. 31, 2003

(65) Prior Publication Data

US 2004/0039773 A1 Feb. 26, 2004

(30) Foreign Application Priority Data

Aug. 9, 2002 (JP) ............... 2002-233441

(51) Int. Cl.
G06F 12/00 (2006.01)
(52) U.S. Cl. ................. 711/156; 713/151
(58) Field of Classification Search ........... 711/170, 711/156, 144, 145, 159; 713/201, 151, 153; 717/174, 122; 709/220
See application file for complete search history.

(56) References Cited

U.S. PATENT DOCUMENTS

| | | | |
|---|---|---|---|
| 6,117,186 A * | 9/2000 | Wydall et al. | 717/174 |
| 6,202,096 B1 | 3/2001 | Williams et al. | |
| 6,629,316 B1 * | 9/2003 | Curtis | 717/174 |
| 6,734,827 B2 * | 5/2004 | Killen et al. | 343/792.5 |
| 6,738,966 B1 * | 5/2004 | Tanaka | 717/140 |
| 6,952,479 B2 * | 10/2005 | Shavit et al. | 713/193 |
| 7,117,482 B2 * | 10/2006 | Nguyen et al. | 717/122 |
| 2002/0104019 A1 * | 8/2002 | Chatani et al. | 713/201 |
| 2003/0023707 A1 * | 1/2003 | Ryan | 709/220 |
| 2003/0233385 A1 * | 12/2003 | Srinivasa et al. | 709/1 |
| 2004/0039773 A1 * | 2/2004 | Yoshida | 709/201 |
| 2004/0181677 A1 * | 9/2004 | Hong et al. | 713/188 |
| 2005/0256858 A1 * | 11/2005 | McArdle | 707/4 |
| 2009/0265540 A1 * | 10/2009 | Jin et al. | 713/150 |

FOREIGN PATENT DOCUMENTS

| | | |
|---|---|---|
| EP | 0 872 991 | 10/1998 |
| EP | 0 886 411 | 12/1998 |
| EP | 1072976 A2 * | 1/2001 |
| EP | 0 995 153 | 11/2001 |
| EP | 0 976 058 | 12/2001 |
| JP | 63-211433 | 9/1988 |
| JP | 02-287824 | 11/1990 |
| JP | 09-305381 | 11/1997 |

(Continued)

OTHER PUBLICATIONS

Japanese Office Action (mailed Nov. 13, 2007) in corresponding Japanese Patent Application No. 2002-233441.

(Continued)

Primary Examiner—Pierre-Michel Bataille
(74) Attorney, Agent, or Firm—Staas & Halsey LLP

(57) ABSTRACT

A technology prevents an operational mistake and reduces a labor and a time necessary for the operation in a system which a repetition of the same or similar operation steps is required of. An information processing system includes a first storage module storing step information containing parameters, a second storage module storing values of the parameters, and a module executing steps specified by the step information in a way that replaces a parameter of the step information with a value of the parameter.

18 Claims, 9 Drawing Sheets

FOREIGN PATENT DOCUMENTS

| | | |
|---|---|---|
| JP | 11-143701 | 5/1999 |
| JP | 2001-524231 | 11/2001 |
| JP | 2002-099411 | 4/2002 |
| JP | 2002-132516 | 5/2002 |
| WO | 98/47076 | 10/1998 |
| WO | 99/04330 | 1/1999 |
| WO | WO 2009005089 A1 * | 1/2009 |

OTHER PUBLICATIONS

Notice of Reason for Rejection dated Aug. 10, 2010 issued in the corresponding Japanese Appeal Case No. 2008-15714 (Patent Applicaion No. 2002-233441).

"Windows 98 Network Building Guide", SOFTBANK Publishing, 1998: pp. 65-72.

* cited by examiner

FIG. 4

| NAME OF ITEM | ENTRY | EXPLANATION/ENTRY EXAMPLE |
|---|---|---|
| SELECTION OF PEN OR PENCIL | PENCIL | |
| FIRST NAME | KEISUKE | |
| LAST NAME | YOSHIDA | |
| NAME OF DRIVE | D | |

FIG. 5

| NAME OF ITEM | ENTRY | EXPLANATION /ENTRY EXAMPLE | NAME OF PARAMETER | EXTENSION AREA | CHECK | OUTPUT FILE |
|---|---|---|---|---|---|---|
| | | | | | | Teditor.def |
| SELECTION OF PEN OR PENCIL | PENCIL | | PEN_PENCIL | | {pen,pencil} | |
| FIRST NAME | KEISUKE | | FIRSTNAME | | isString | |
| LAST NAME | YOSHIDA | | LASTNAME | | isString | |
| NAME OF DRIVE | D | | | | | |

FIG.6

```
PEN_PENCIL=pencil

FIRSTNAME=Keisuke

LASTNAME=Yoshida

DRIVE=d
```

*FIG. 7*

```
[SCRIPT]

RUN=notepad  ~L1
RUN=!wait@1  ~L2
MEMORANDUM UNTITLED=This          ⎫
MEMORANDUM UNTITLED={SPASE}       ⎪
MEMORANDUM UNTITLED=is            ⎪
MEMORANDUM UNTITLED={SPASE}       ⎪
MEMORANDUM UNTITLED=a             ⎪
MEMORANDUM UNTITLED={SPASE}       ⎬ L3
MEMORANDUM UNTITLED=${PEN_PENCIL} ⎪
MEMORANDUM UNTITLED=.             ⎪
MEMORANDUM UNTITLED={ENTER}       ⎪
MEMORANDUM UNTITLED=%f            ⎪
MEMORANDUM UNTITLED=a             ⎭
NAMING AND SAVING=${DRIVE}:¥home¥text00.txt ⎫ L4
NAMING AND SAVING={ENTER}                   ⎭
MEMORANDUM text00.txt=%{F4}  ~L5

RUN=notepad  ~L7
RUN=!wait@1  ~L8
MEMORANDUM UNTITLED=+My           ⎫
MEMORANDUM UNTITLED={SPASE}       ⎪
MEMORANDUM UNTITLED=name          ⎪
MEMORANDUM UNTITLED={SPASE}       ⎪
MEMORANDUM UNTITLED=is            ⎪
MEMORANDUM UNTITLED={SPASE}       ⎪
MEMORANDUM UNTITLED=${FIRSTNAME}  ⎬ L9
MEMORANDUM UNTITLED={SPASE}       ⎪
MEMORANDUM UNTITLED=${LSATNAME}   ⎪
MEMORANDUM UNTITLED=.             ⎪
MEMORANDUM UNTITLED={ENTER}       ⎪
MEMORANDUM UNTITLED=%f            ⎪
MEMORANDUM UNTITLED=a             ⎭
NAMING AND SAVING=${DRIVE}:¥home¥text01.txt ⎫ L10
NAMING AND SAVING={ENTER}                   ⎭
MEMORANDUM text00.txt=%{F4}  ~L11

[ADLIB]
NAMING AND SAVING=y
```

INFORMATION PROCESSING SYSTEM, INFORMATION PROCESSING METHOD AND PROGRAM

BACKGROUND OF THE INVENTION

The present invention relates to a technology of automating operation steps of a system.

An automating scheme of operation steps in a computer or in an information system including the computer, has hitherto involved the use of a script as the case might be. In the script-guided automating scheme of the operation steps, at first, the script is created in a way that matches with a target system, and therefore the script is individually created corresponding to the target system or target operation steps. Further, a test suited to the target system is also needed.

Known as the inventions of this category are technologies disclosed in, e.g., Japanese Patent Laying-Open Publication No. 11-143701, Japanese Patent Domestic Laying-Open Publication No. 2001-524231, Japanese Patent Laying-Open Publication No. 2002-99411.

Japanese Patent Laying-Open Publication No. 11-143701 discloses a method of structuring a scenario for specifying system behaviors in a high-availability system configured by a plurality of servers. According to this technology, however, parameter settings are utilized for creating the scenario defined as a final result product. Therefore, the parameters are fixed with respect to the created scenario itself.

The technology disclosed in Japanese Patent Domestic Laying-Open Publication No. 2001-524231 provides a user interface (UI) on the basis of a device for providing options and a device that displays to a user the options provided from the option providing device and prompts the user to select the option. This UI is created based on an HTML (HyperText Markup Language) script.

The system disclosed in Japanese Patent Laying-Open Publication No. 2002-99411 is applied to a program running on a plurality of computer connected to each other via a communication line. This system generates program data and utilizes a setting file for creating the program data.

The prior arts given above, however, do not provide a scheme that the computer as a substitute for the user executes the operation steps that should be done by the user. On the other hand, for example, according to Windows98 as an operating system (that will hereinafter be abbreviated to OS) provided by Microsoft Corp., U.S.A., the following automatic install tool is used.

To start with, the user sets a variety of parameters and saves these parameters in a predetermined definition file by utilizing a Window program named Batch98. Then, the user specifies this definition file and starts an install execution program. Then, the computer automatically installs Windows98 from a medium such as a CD-ROM etc in a way that sets the parameters saved in the definition file. This technique, however, schemes to automate the installation of the OS by specifying the parameters in the install execution program which is one tool of Windows98. Therefore, this technique has no design of saving a labor for the general operations on the computer.

SUMMARY OF THE INVENTION

It is a primary object of the present invention, which was devised in view of the problems inherent in the prior arts described above, to provide a technology capable of preventing an operational mistake and reducing a labor and a time necessary for the operation in a system which a repetition of the same or similar operation steps is required of.

To accomplish the above object, according to one aspect of the invention, an information processing system includes a first storage module storing step information containing parameters, a second storage module storing values of the parameters, and a module executing steps specified by the step information in a way that replaces a parameter of the step information with a value of the parameter.

Herein, the step information represents, for instance, in the information processing system described above, steps in which the information processing system executes the same or similar operation instead of the user who should repeat the same or similar operation.

Preferably, the step information may represent steps configuring a predetermined target system by combining a plurality of subsystems, and the parameter may be characteristic information that individually adapts the subsystem to the target system.

Herein, the subsystem is, e.g., a computer program installed into the present information system, hardware incorporated into the present information system, a computer program configuring a part of the present information processing system, and so on.

The scheme that individually adapts the subsystem to the target system implies, for example, that conditions for executing the individual programs are adapted to specifications of the target system.

Preferably, the step information may be encrypted, and the system may further include a module decrypting the step information encrypted.

Preferably, the information processing system may further include a module accepting a value setting with respect to the parameter, and a module judging whether the value with the setting accepted can be applied to the target system or subsystem.

Herein, the judgement as to whether the value with the setting accepted can be applied to the target system or subsystem, is a judgement of whether the value is allowable as, for example, the parameter described above.

According to another aspect of the invention, there is provided a method by which a computer or other device or machine executes any one of the processes described above.

According to a further aspect of the invention, there is provided a storage medium recorded with a program executed by the computer or other device or machine to actualize any one of the functions described above.

As explained above, the technology according to the present invention prevents the operational mistake and reduces the labor and the time necessary for the operation in the system which the repetition of the same or similar operation steps is required of.

BRIEF DESCRIPTION OF THE DRAWINGS

FIG. 4 is a diagram showing an example of a design sheet 8;

FIG. 5 is a diagram showing an example of design sheet definition data;

FIG. 6 is a diagram showing an example of a setting file 5;

FIG. 7 s a diagram showing example of a script;

DETAILED DESCRIPTION OF THE PREFERRED EMBODIMENT

An information system in one embodiment of the present invention will hereinafter be described with reference to FIGS. 1 through 9.

Figure 1:
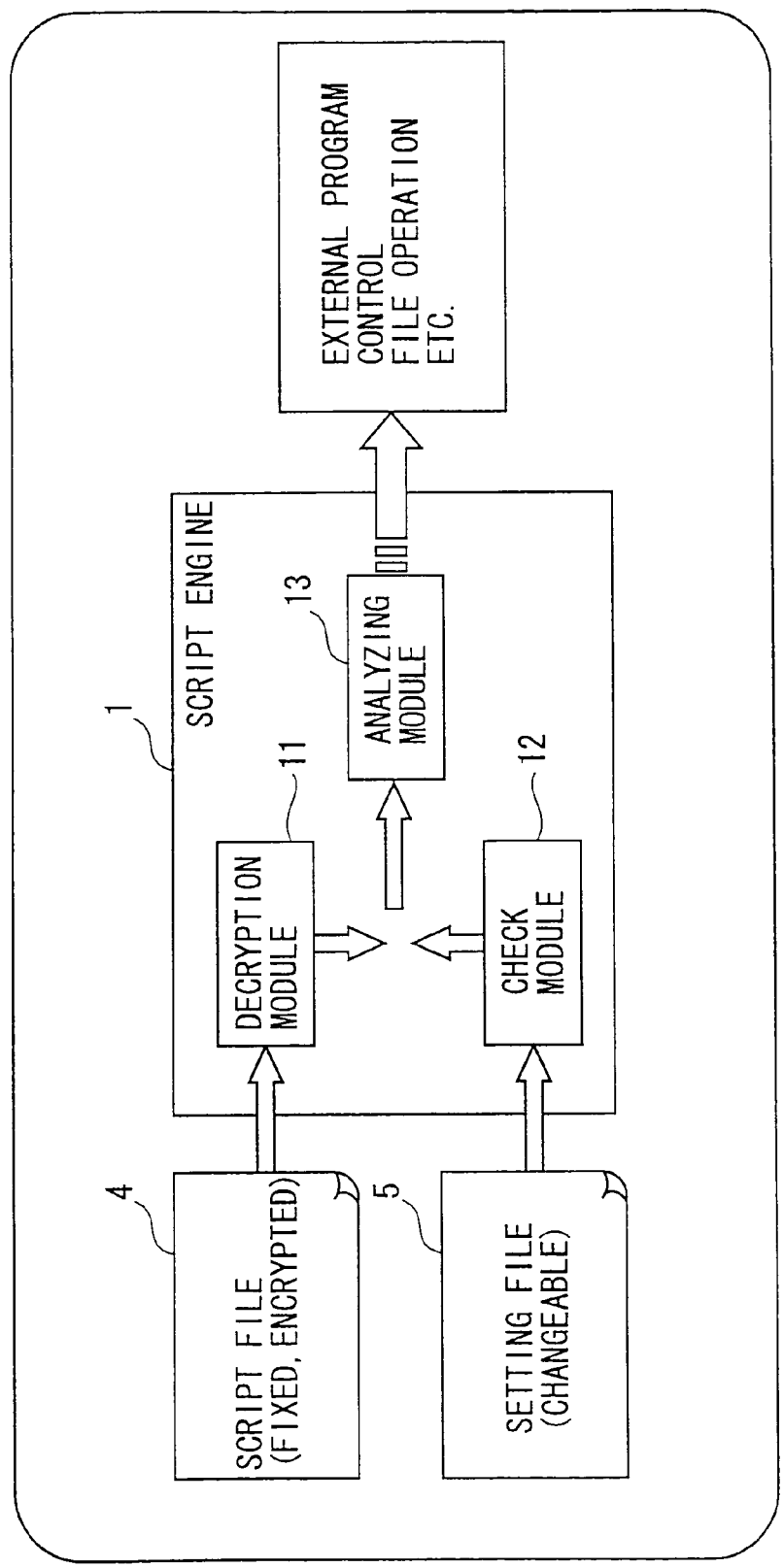
FIG. 1 is a diagram showing a principle of an information system on one embodiment of the present invention.
Figure 2:
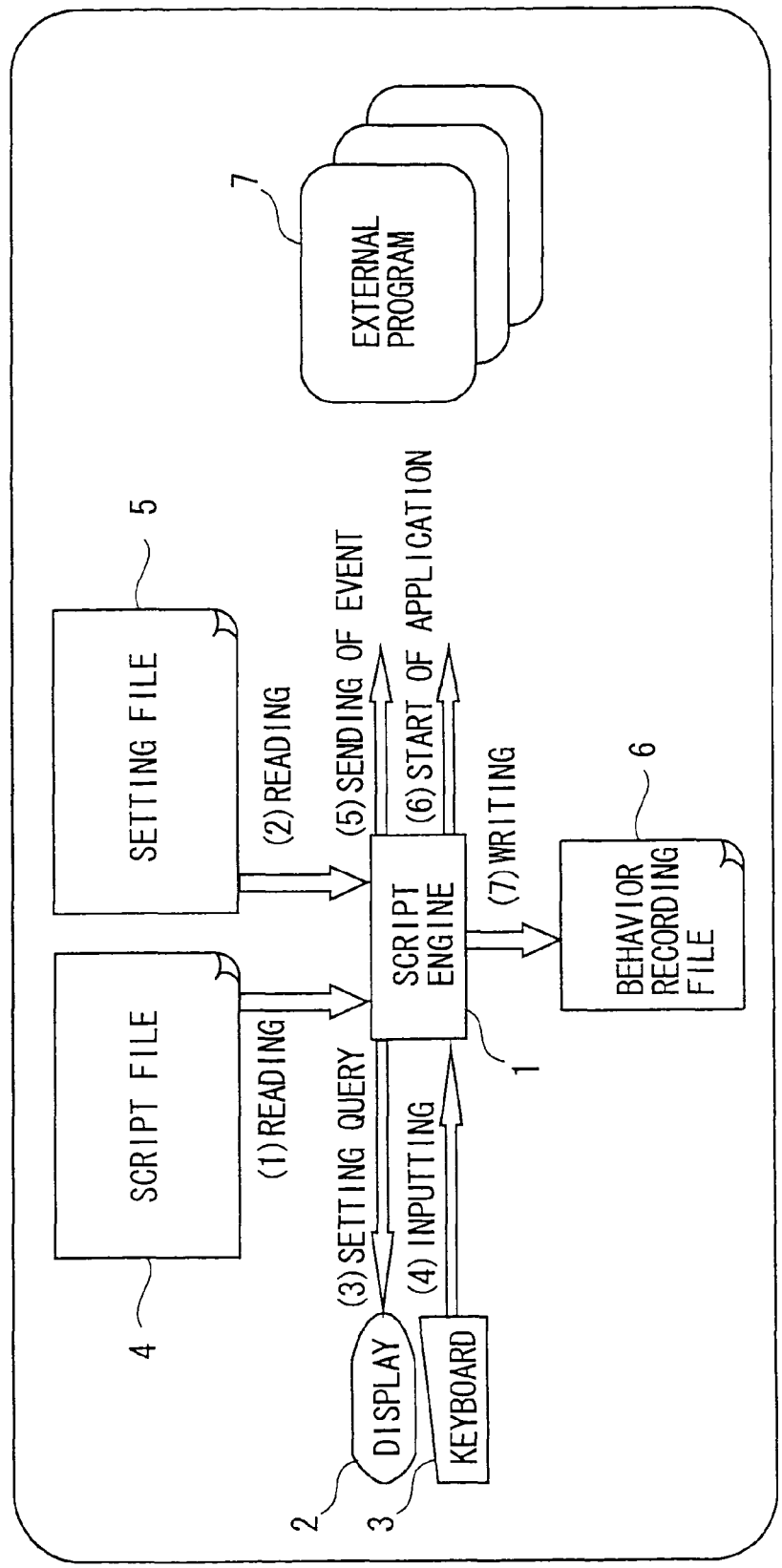
FIG. 2 is a diagram showing a system architecture of the information system.
Figure 3:
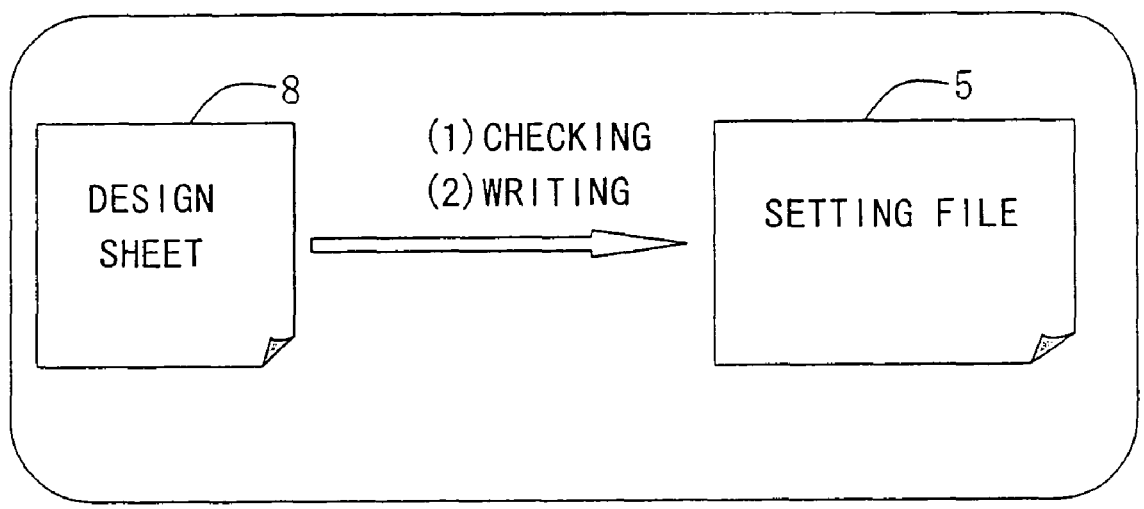
FIG. 3 is a diagram showing a structure of a user interface (UI) of the information system.
Figure 8:
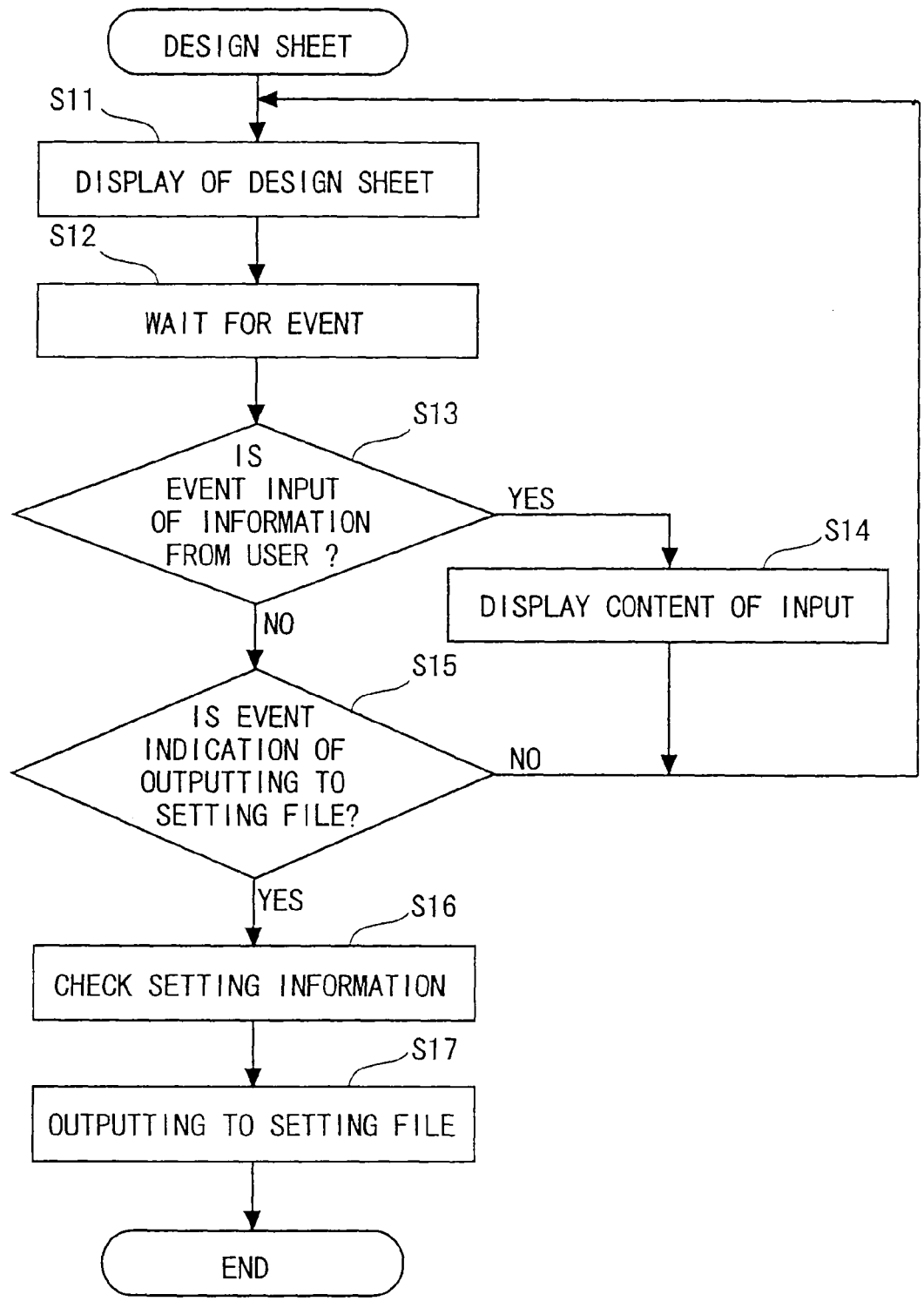
FIG. 8 is a flowchart showing a processing flow of the design sheet 8.
Figure 9:
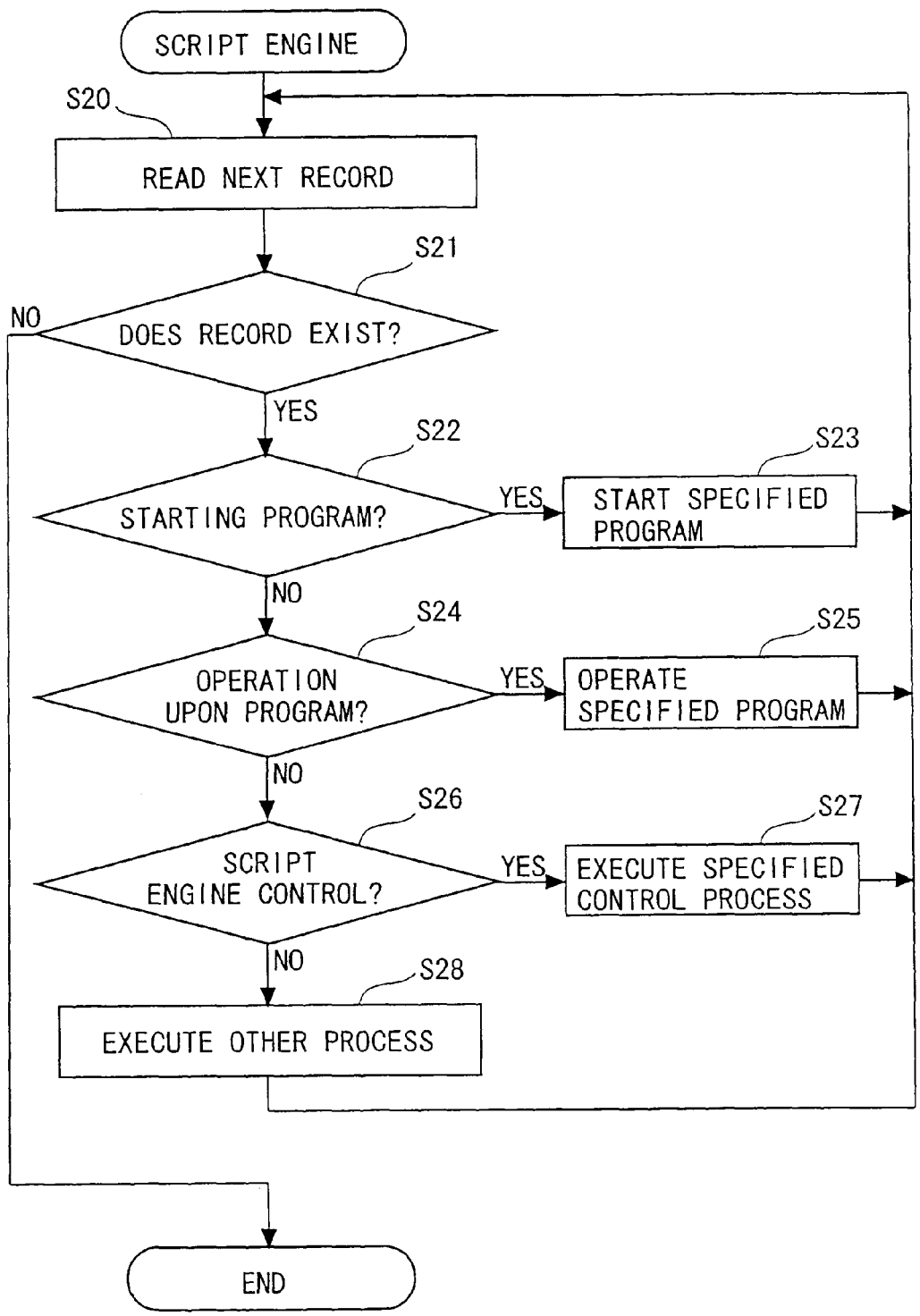
FIG. 9 is a flowchart showing a processing flow of a script engine 1.

FIG. 1 is a diagram showing a principle of this information system. FIG. 2 is a diagram showing a system architecture of this information system. FIG. 3 is a diagram showing a structure of a user interface (UI) of this information system. FIG. 4 shows an example of a design sheet 8 illustrated in FIG. 3. FIG. 5 shows an example of design sheet definition data that define contents of the design sheet 8. FIG. 6 shows an example of a setting file 5. FIG. 7 shows an example of a script utilized in the present information system. FIG. 8 is a flowchart showing a processing flow of the design sheet 8. FIG. 9 is a flowchart showing a processing flow of a script engine 1.

<Principle of Information System>

FIG. 1 is the diagram showing the principle of this information system. As shown in FIG. 1, this information system is configured of a script file 4, a setting file 5 for defining values of parameters with respect to the script file 4, and a script engine 1 for reading the script file 4 and the setting file 5, and executing a process specified in the scrip.

The script file 4 is stored with the script. The script is defined as an aggregate of information containing commands analyzed by the script engine 1 and control information that controls an interpretation of the script. The script is the fixed information that can not be changed and is encrypted by a predetermined encryption program.

Each of the commands structuring the script is assigned an operand corresponding to the command. Specific pieces of data such as a character string of a name etc, a numerical value indicating a predetermined quantity and so on, may be designated as an operand of the command. A parameter may, however, be assigned instead of designating the specific data as an operand in the command. A value itself of this parameter may be defined in the setting file 5.

The setting file 5 is a file in which the values of the parameters are defined. The script is the fixed information that can not be changed, whereas the information of the setting file is changeable.

The script engine 1 includes a decryption module 11 for reading and decrypting the encrypted script, a check module 12 for reading and checking a content of the setting file 5, and an analyzing module 13 for making an analysis in a way that combines the decrypted script with the readout setting file 5.

The components of the script engine 1, such as the decryption module 11, the check module 12 and the analyzing module 13, are actualized as a program executable by a computer. The script engine 1, based on a result of the analysis by the analyzing module 13, controls a program (which may be called an external program) other than the script engine 1, or operates the file specified by the script 4.

<System Architecture>

FIG. 2 is the diagram showing a system architecture of the present information system. This information system includes the script engine 1 executed by an unillustrated CPU, the script file 4 read by the script engine 1, the setting file 5 read likewise, a display 2 for displaying the information to a user, a keyboard 3 used for the user to input the information, a behavior recording file 6 for recording behaviors of the script engine 1, and an external program 7.

The script engine 1, the script file 4 and the setting file 5 have already been explained referring to FIG. 1.

The display 2 queries of the user or prompts the user to do various categories of settings such as inputting an option or a value and so forth, by displaying pieces of information such as images, menus, icons etc to the user. The user inputs the information through the keyboard 3 in response to the query.

The behavior recording file 6 is a so-called log file and is stored with a record of the behaviors of the script engine 1.

The script engine 1 starts the external program 7. Further, the script engine 1 transmits information such as events etc or messages to the on-the-run external program 7.

An outline of the processing of the script engine 1 will be described with reference to FIG. 2. The script engine 1 at first reads a content of the script file 4 and the setting file 5 corresponding to the script file 4 ((arrow (1), (2) in FIG. 2).

Further, in an example shown in FIG. 2, the script engine 1 queries of the user through on the display 2 (arrow (3) in FIG. 2).

The user confirms the content of the setting and inputs a new piece of information or changes the setting (arrow (4) in FIG. 2). When the new information is inputted or the setting is changed, as shown in FIG. 1, a check of the setting file 5 is executed.

The script engine 1, when given the script file 4 and the effective setting file 5, sends an operation, e.g., an event to the external program 7 (arrow (5) in FIG. 2) or starts the external program 7 (arrow (6) in FIG. 2). A result of these operations are written as a record of behaviors to the behavior recording file 6 (arrow (7) in FIG. 2).

FIG. 3 is the diagram showing a structure of the user interface (UI) of the present information system. This information system is provided with the design sheet 8 as the UI for setting the information in the setting file 5. The design sheet 8 can be actualized by, e.g., a spreadsheet etc and serves to guide the information setting by the user.

The design sheet 8 checks a content set by the user and, if a checked result is correct, stores the setting file 5 with this piece of information.

Hence, according to the present information system, the user is guided by the design sheet 8 to check that conditions necessary for use together with the script are prepared (arrow (1) in FIG. 3), and thereafter the inputted information can be written to the setting file 5 (arrow (2) in FIG. 3).

FIG. 4 shows an example of the design sheet 8. In this embodiment, the design sheet 8 has a "name of item" field, an "entry" field and an "explanation/entry example" field. The name of item is a name representing a category of the information set in this item.

Further, the user sets a value of this item in the entry field. For example, if "selection of pen or pencil" is entered in the "name of item" field, the user sets a character string of "pen" or "pencil" in the "entry" field. Moreover, if the name of item is "first name", the user sets a user name in the "entry" field. Further, if the name of item is "last name", the user sets a family name of the user in the "entry" field. An explanation of the content that should be set in each item, a setting example etc, are shown in the "explanation/entry example" field.

According to the present information system, when the design sheet 8 writes the set data to the setting file 5, the design sheet 8 checks the content of the setting file 5. Thus, the user can correct an error with the aid of the design sheet 8 by performing the check in the process of creating the setting file 5 from the design sheet 8.

DATA EXAMPLE

FIG. 5 shows an example of design sheet definition data for defining the content of the design sheet 8. The design sheet definition data has, in addition to the "name of item" field, the "entry" field and the "explanation/entry example" field which are displayed in the design sheet 8 shown in FIG. 4, further a "name of parameter" field, an "extension area" field, a "check" field and an "output file" field.

A name of items displayed in the design sheet 8 is defined in the "name of item" field of the design sheet definition data. Further, the "entry" field of the design sheet definition data is stored with the information (the value etc) set in the "entry" field of the design sheet 8.

The data in the "explanation/entry example" field displayed in the design sheet 8 is defined in the "explanation/entry example" field of the design sheet definition data. A name of parameter of which a value is set when outputting the value in the "entry" field of each item to the setting file 5, is defined in the "name of parameter" field. For example, when "PEN_PENCIL" is defined in the "name of parameter" field and when "pencil" is inputted to the "entry" field, PEN_PENCIL=pencil is outputted to the setting file 5. The parameter of which the value is set, is specified by this name of parameter, If the data in the "entry" field needs executing of a special process, a program etc that executes this process is specified in the extension area. For instance, this is a case where the data in the "entry" field is segmented into a plural pieces of data and values are set in a plurality of areas of the setting file 5. Further, that is a case where the plurality of values set in the "entry" field are combined and thus synthesized into one piece of data.

A check mode for checking the information inputted in the "entry" field, is defined in the "check" field. In a record specified by, for instance, the item name of "selection of pen or pencil", if neither "pen" nor "pencil" is entered as a value in the "entry" field, an error is detected according to the specification of the check mode "{pen, pencil}". Further, in a record specified by e.g., the item name of "first name" etc, a definition of being a character string, a limit in character count etc are designated.

FIG. 6 shows an example of the data in the setting file 5. This example shows that a value "pencil" is set in a parameter PEN_PENCIL, a value Keisuke is set in a parameter FIGST-NAME, a value Yoshida is set in a parameter LASTNAME, and a value d is set in a parameter DRIVE.

FIG. 7 shows an example of the script utilized in the present information system. In this example, a program (a text editor) named "notepad" is started (L1) and, after an interval of a 1-sec standby time (L2), a value transferred to this text editor is defined (L3).

Among those values, "This", "[SPACE]", "is" etc are values specifically designated within the script, while $ [PEN_PENCIL]"etc is a parameter defined in the setting file 5.

Referring to FIG. 7, "Memorandum Untitled" is defined as a title of a window in which the text editor is displayed. The script engine 1 transfers those values to a program that displays a window title named "Memorandum Untitled".

Moreover, according to the definitions in FIG. 7, the data transferred to the text editor are saved in a predetermined file (text00.txt) (L4), and the window is changed into a window title named "text00.txt-memorandum", i.e., the one containing a text file stored with the data of the text editor (L5).

The script in this embodiment is capable of designating an execution of a plurality of programs. The example in FIG. 7 shows that the text editor is further started (L7), after there is a 1-sec wait (L8), the data are transferred also to the text editor started second time (L9), the data of the text editor are saved (L10) and then a change of the window title is designated (L11). Thus, the operation steps executed repeatedly are described in the script, whereby a user's labor for the operations can be saved.

The script may, however, be described in the way not that the same program is started twice as illustrated in FIG. 7 but that a plurality of different programs are started. Further, the script may be described so that an event is transmitted to the already-running program.

<Operation>

FIG. 8 shows a processing flow of the design sheet 8. The design sheet 8 is structured of, e.g., a spreadsheet. To start with, the design sheet 8, when started, based on a designation by the user, reads the definitions in the design sheet (see FIG. 5), and displays a sheet (table) concerned (S11).

Next, the design sheet 8 comes to a standby status for an event (S12). When the event occurs, the design sheet 8 judges whether the event is an input of information from the user (S13).

If the event is the information input from the user, the design sheet 8 displays an input content on the sheet (S14) Thereafter, the design sheet 8 returns the control to S12.

Whereas if the event is not the information input from the user, the design sheet 8 judges whether the event is a user's indication of output to the setting file 5 (S15). If the event is not the user's indication of output to the setting file 5, the design sheet 8 makes the control loop back to S12.

If the vent is the user's indication of output to the setting file 5, the design sheet 8 checks a content of the setting (S16). Then, if an error exists in the setting content, the design sheet 8 prompts the user to correct the error. Then, the design sheet 8 outputs the corrected setting content to the setting file 5 (S17). Thereafter, the design sheet 8 terminates the processing.

FIG. 9 shows processes of the script engine 1. The script engine 1, when a script file 4 is specified, starts a process. In this process, the script engine 1 at first reads a next record from the script file 4 (S20).

Then, the script engine 1 judges whether the record exists in this script file 4 (S21).

If the record exists in the script file 4 concerned, the script engine judges whether this record is a record for commanding to start a program (S22). If this record commands to start a program, the script engine 1 starts the designated program (S23) Then, the script engine 1 returns the control to S20.

If the above record is not the record that commands to start a program, the script engine 1 judges whether this record is a record for commanding an operation upon a program (S24). If this record is the record commanding an operation upon a program, the script engine 1 executes a designated operation upon the program specified by this record (S25).

Herein, the operation upon the program is, for example, a transfer of the character string to the text editor, a transfer of an install parameter for executing an installation of a program, a transmission of an event upon a wait-for-event program, and a designation of each of system parameters (such as device definition information, address definition information, user definition information, access management information to the file, a limit in memory space etc) given to a system management program. Thereafter, the script engine 1 makes the control loop back to S20.

If the above record is not the record commanding the operation upon the program, the script engine 1 judges whether this record is a record for controlling the script engine 1 itself (S26). If this record is the record for controlling the script engine 1 itself, the script engine 1 executes a control process as specified by this record (S27)

Herein, the control of the script engine 1 itself includes, for instance, waiting for a time of the designation, shifting of a reading position to the predetermined record (which is a so-called branch instruction) within the script file 4, judging whether a predetermined condition is given or not, repeating a predetermined process and so on. Thereafter, the script engine 1 returns the control to S20.

When judging in S26 that the record concerned is not the record for controlling the script engine 1 itself, the script engine 1 executes other process (S28). Other process is, e.g., a process of skipping though a comment described in the script. Thereafter, the script engine 1 returns the control to S20.

When judging in S21 that there is no next record in the script file, the script engine 1 terminates the process with respect to this script file 4.

As discussed above, according to the present information system, the operation can be executed in the form adapted to a target system depending on the content set in the setting file 5 in a way that uses the general-purpose script.

For example, in the case of configuring the system by use of a plurality of subsystems on the computer, the following operations need repeating.

(1) Install the subsystem (e.g. a program).

(2) Set execution conditions (such as an execution timing, an execution time, an execution count etc) or execution environments (such as a capacity of a main memory to be utilized), a disk capacity, conditions of peripheral devices, access control and so forth) of this subsystem.

(3) The above operations (1) and (2) are repeated the same number of times as a predetermined number of subsystems.

(4) The operations (1) through (3) are repeated the same number of times as a predetermined number of computers. In this case, the execution conditions or the execution environments etc are changed for every computer as the necessity arises.

According to the present information system, the setting file 5 is stored with the set values that needs to be changed depending on the target system, and the system configuring steps for the plurality of target system can be shared in common by one script. Therefore, the operations (1) trough (4) described above cam be executed by the computer in accordance with the common general-purpose script.

Moreover, the operation steps can be concealed by encrypting the script file, and the operation for the system can be executed without disclosing the detailed operation steps.

Further, the information set in the thus-structured setting file 5 is inputted via the design sheet 8. The design sheet 8, before outputting the inputted or changed information to the setting file 5, confirms a compatibility with the target system. Accordingly, the user can check the setting content before the computer is made to actually execute the script.

MODIFIED EXAMPLE

According to the embodiment discussed above, the design sheet 8 is structured of the program, e.g., the spreadsheet, different from the script engine 1. The embodiment of the present invention is not, however, limited to this structure. For example, the design sheet 8 may be structured as a program integral with the script engine 1. Further, the design sheet 8 may also be structured as an application program cooperating with the script engine 1.

<Storage Medium Readable by Computer and Other Devices and Machines>

A program executed by a computer to actualize any one of the functions described above may be recorded on a storage medium readable by the computer etc. Then, the computer reads and executes the program on this storage medium, thereby providing the function thereof.

Herein, the storage medium readable by the computer etc. includes recording mediums capable of storing information such as data, programs, etc. electrically, magnetically, optically and mechanically or by chemical action, which can be all read by the computer. What is demountable out of the computer among those storage mediums maybe, e.g., a floppy disk, a magneto-optic disk, a CD-ROM, a CD-R/W, a DVD, a DAT, an 8 mm tape, a memory card, etc.

Further, a hard disk, a ROM (Read Only Memory) and so on are classified as fixed type storage mediums within the computer.

What is claimed is:

1. An information processing system comprising:
   a first storage medium readable by a computer and storing a script including parameters, the script is fixed information set so that cannot be changed;
   a checking module checking values of the parameters;
   a second storage module, when a checked result is correct, storing values of the parameters, the parameters are information set so that the values are changeable; and
   a module executing steps specified by the script in a way that replaces a parameter of the script with a value of the parameter;
   wherein the script and the values of the parameters are stored in separate files,
   the script is encrypted, and
   said system further comprises a module decrypting the encrypted script.

2. An information processing system according to claim 1, wherein the script represents steps configuring a predetermined target system by combining a plurality of subsystems, and
   the parameter is characteristic information that individually adapts said subsystem to the target system.

3. An information processing system according to claim 2, further comprising:
   a module accepting a value setting with respect to the parameter; and
   a module judging whether the value with the setting accepted can be applied to said target system or subsystem.

4. An information processing system according to claim 1, further comprising:
   a module combining the decrypted script with a readout setting file.

5. An information processing method comprising:
   referring to a script including parameters, the script is fixed information set so that cannot be changed;
   checking values of the parameters, the parameters are changeable information set so that the values are changeable;
   when a checked result is correct, referring to values of the parameters; and
   executing steps specified by the script in a way that replaces a parameter of the script with a value of the parameter;

wherein the script and the values of the parameters are stored in separate files, the script is encrypted, and said method further comprises decrypting the encrypted script.

6. An information processing method according to claim 5, wherein the script represents steps configuring a predetermined target system by combining a plurality of subsystems, and the parameter is characteristic information that individually adapts said subsystem to the target system.

7. An information processing method according to claim 6, further comprising:

accepting a value setting with respect to the parameter; and judging whether the value with the setting accepted can be applied to said target system or subsystem.

8. An information processing method according to claim 5, further comprising:

combining the decrypted script with a readout setting file.

9. An information processing method comprising:

encrypting a script, the script is fixed information set so that cannot be changed;

decrypting the encrypted script;

checking values of parameters contained included in the script, the parameters are changeable information set so that the values are changeable;

referring to values of the parameters when the checking produces a correct result; and replacing a parameter of the script with a value of the parameter by executing steps specified by the script, wherein the script and the values of the parameters are stored in separate files.

10. A program of instructions stored in a storage medium readable by a computer and executable by a machine to perform method, the method comprising:

referring to a script including parameters, the script is fixed information set so that cannot be changed;

checking values of the parameters, the parameters are changeable information set so that the values are changeable;

when a checked result is correct, referring to values of the parameters; and executing steps specified by the script in a way that replaces a parameter of the script with a value of the parameter;

wherein the script and the values of the parameters are stored in separate files, the script is encrypted, and said program further comprises decrypting the encrypted script.

11. A program according to claim 10, wherein the script represents steps configuring a predetermined target system by combining a plurality of subsystems, and the parameter is characteristic information that individually adapts said subsystem to the target system.

12. A program according to claim 11, further comprising:

accepting a value setting with respect to the parameter; and judging whether the value with the setting accepted can be applied to said target system or subsystem.

13. A program according to claim 10, further comprising:

combining the decrypted script with a readout setting file.

14. A storage medium readable by a machine, tangible embodying a program of instructions executable by the machine to perform method, the method comprising:

encrypting a script, the script is fixed information set so that cannot be changed;

decrypting the encrypted script;

checking values of the parameters included in the script, the parameters are changeable information set so that the values are changeable;

referring to values of the parameters when the checking produces a correct result; and replacing a parameter of the script with a value of the parameter by executing steps specified by the script, wherein the script and the values of the parameters are stored in separate files.

15. A storage medium readable by a machine, tangible embodying a program of instructions executable by the machine to perform method, the method comprising:

referring to a script including parameters, the script is fixed information set so that cannot be changed;

checking values of the parameters, the parameters are changeable information set so that the values are changeable;

when a checked result is correct, referring to values of the parameters; and executing steps specified by the script in a way that replaces a parameter of the script with a value of the parameter, wherein the script and the values of the parameters are stored in separate files, the script is encrypted, and said method further comprises decrypting the encrypted script.

16. A storage medium readable by a machine tangible embodying a program according to claim 15, wherein the script represents steps configuring a predetermined target system by combining a plurality of subsystems, and the parameter is characteristic information that individually adapts said subsystem to the target system.

17. A storage medium readable by a machine tangible embodying a program according to claim 16, further comprising:

accepting a value setting with respect to the parameter; and judging whether the value with the setting accepted can be applied to said target system or subsystem.

18. A storage medium readable by a machine tangible embodying a program according to claim 15, further comprising:

combining the decrypted script with a readout setting file.

* * * * *

UNITED STATES PATENT AND TRADEMARK OFFICE
CERTIFICATE OF CORRECTION

| | | |
|---|---|---|
| PATENT NO. | : 7,877,557 B2 | |
| APPLICATION NO. | : 10/630714 | |
| DATED | : January 25, 2011 | |
| INVENTOR(S) | : Keisuke Yoshida | |

It is certified that error appears in the above-identified patent and that said Letters Patent is hereby corrected as shown below:

Column 8, Line 30, In Claim 1, after "are" insert --changeable--.

Signed and Sealed this
Twenty-sixth Day of April, 2011

David J. Kappos
*Director of the United States Patent and Trademark Office*